H. S. WESTBROOK.
LEVEL INDICATOR.
APPLICATION FILED JAN. 31, 1918.
1,284,005.
Patented Nov. 5, 1918.
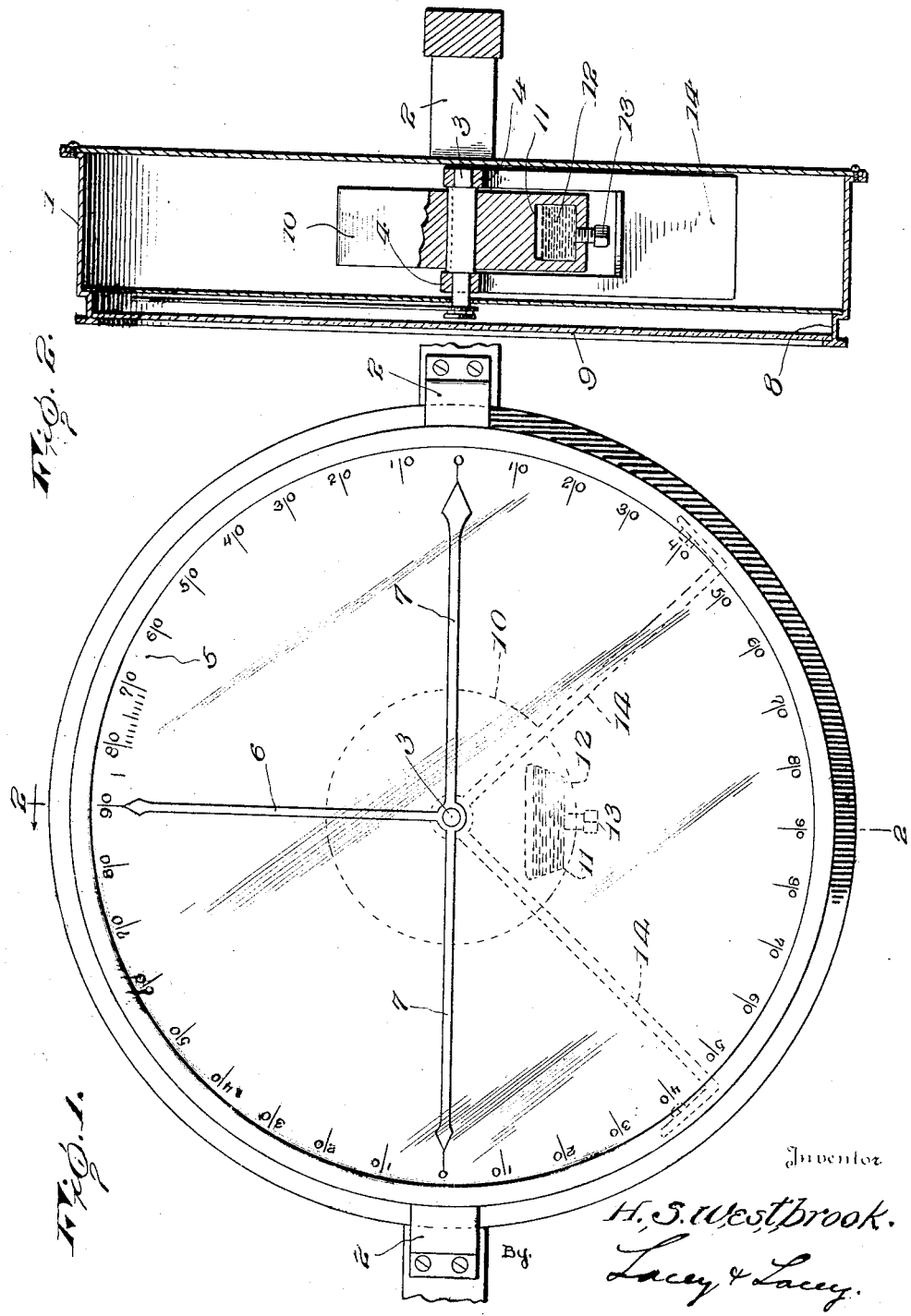

UNITED STATES PATENT OFFICE.

HOMER S. WESTBROOK, OF FORT WORTH, TEXAS.

LEVEL-INDICATOR.

1,284,005.　　　　Specification of Letters Patent.　　　Patented Nov. 5, 1918.

Application filed January 31, 1918. Serial No. 214,699.

*To all whom it may concern:*

Be it known that I, HOMER S. WESTBROOK, a citizen of the United States, residing at Fort Worth, in the county of Tarrant and State of Texas, have invented certain new and useful Improvements in Level-Indicators, of which the following is a specification.

This invention relates to level indicators and is intended more particularly for use upon aeroplanes and other types of flying machines to indicate the angle at which the machine may be rising or descending and also to indicate when it is upon a level keel. The invention is illustrated in the accompanying drawings and consists in certain novel features which will be hereinafter first fully described and then more particularly pointed out in the appended claim.

In the drawings:

Figure 1 is a front elevation of a device embodying my invention;

Fig. 2 is a transverse vertical section of the same on the line 2—2 of Fig. 1.

In carrying out my invention, I employ a casing 1 which is preferably cylindrical in form and is constructed of any material which will withstand dampness and other weather conditions. This casing is to be constructed with air-tight and weather-proof joints so that it will be a thorough effective protection to the indicating device. At proper points upon the peripheral wall of the casing I secure feet or brackets 2, which are adapted to be secured in any convenient manner to the frame or body of the aeroplane. Between the front and rear walls of the casing is provided a shaft 3 which is located concentric with the axis of the casing and is journaled in suitable bearings or brackets 4 formed within the casing. The front end of the shaft extends through the front wall of the casing, and the said front wall has its face provided with a graduated dial, shown at 5, the graduations being so located and numbered that they will represent degrees reading from zero, denoting a level keel to 90 denoting a vertical keel, the graduations extending in both directions from the zero point to the 90° point so that they will accurately define the four right-angles or quadrants of the dial. Secured upon the front end of the shaft 3 so as to rotate therewith is a normally vertical pointer or hand 6 and a pair of hands or pointers 7 extending at right-angles to the said hand 6. It will be readily understood that when the machine is at rest and upon a level keel the two hands 7 will register with the oppositely disposed zero points of the dial, while the end of the hand 6 will register with the upper 90° point, as indicated in Fig. 1. The peripheral wall of the casing is extended beyond the front wall of the same to provide a circular rim 8, and said rim supports and secures a transparent covering 9 through which the dial may be read, the described construction providing a chamber in which the indicators or hands will be housed so that they will not be apt to be broken or bent by chance blows from the aviator or other persons. Between its ends, and within the casing 1, a disk 10 is secured to the shaft 3, and this disk is provided with a pocket 11 below the shaft which pocket is to be filled with mercury, as indicated at 12, and the filling opening effectually closed by a plug 13. The bearings 4 for the shaft 3 may be conveniently provided at the apex of a bracket 14 which is secured to the inner surface of the peripheral wall of the casing so that the shaft will be firmly supported and will be braced against torsional strain. This construction of bracket also will relieve the front and rear walls of the casing of the weight of the shaft and the parts carried by it so that buckling of said walls will be counteracted.

It is thought to be obvious that as the machine assumes a rising or falling inclination, the hands 6 and 7 will be shifted relative to the dial 5 inasmuch as the weight of the mercury in the pocket 11 will tend to hold the disk 10 and shaft 3 stationary so that the casing will rotate about the said shaft, and consequently, the reading of the hands will be changed and will at all time show the degree at which the machine may be rising or falling.

Having thus described the invention, what is claimed as new is:

A level indicator consisting of a casing, supporting feet on the exterior of the casing, a bracket within the casing, a shaft journaled in said bracket and having its front end projecting through the front wall of the casing, said wall having on its outer face a graduated dial concentric with said shaft and the side walls of the casing being projected beyond said front wall, a pointer secured on the front end of the shaft to play over said dial, a transparent cover secured in the side walls of the casing over the pointer, a disk secured to the shaft within the casing and having a pocket below the shaft, and mercury in the pocket.

In testimony whereof I affix my signature.

HOMER S. WESTBROOK. [L. S.]